Oct. 13, 1959   W. H. BASELT   2,908,232
SNUBBED TRUCK
Filed Aug. 13, 1956   2 Sheets-Sheet 1
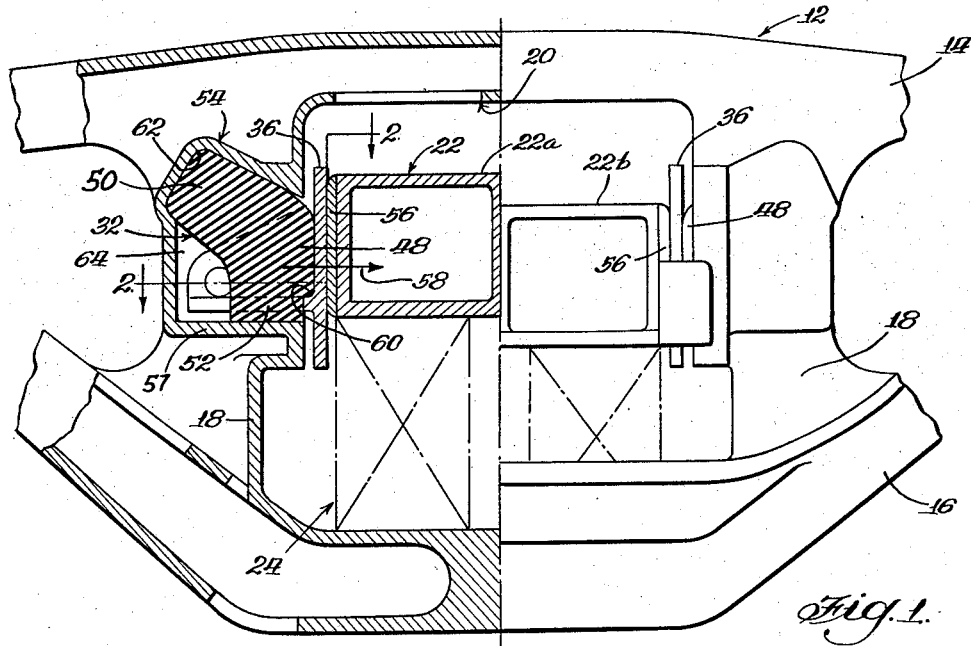
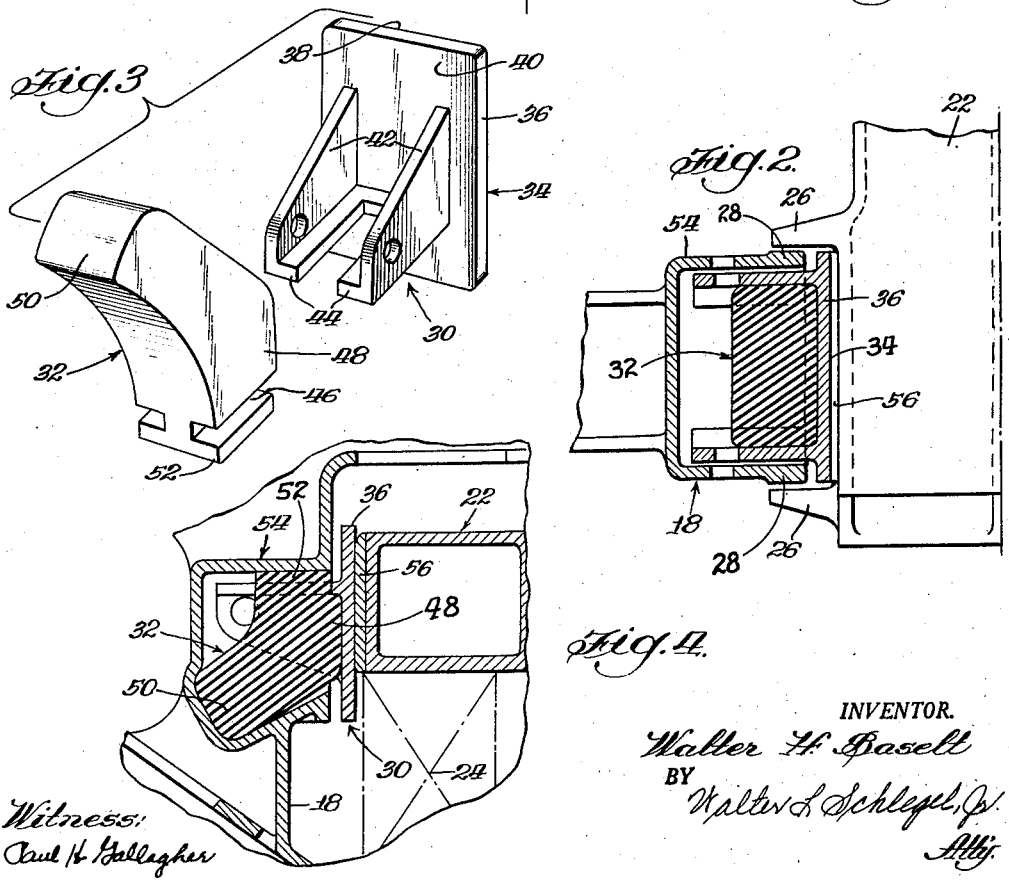
INVENTOR.
Walter H. Baselt
BY Walter L. Schlegel, Jr.
Atty.
Witness:
Paul H. Gallagher Oct. 13, 1959 — W. H. BASELT — 2,908,232
SNUBBED TRUCK
Filed Aug. 13, 1956 — 2 Sheets-Sheet 2
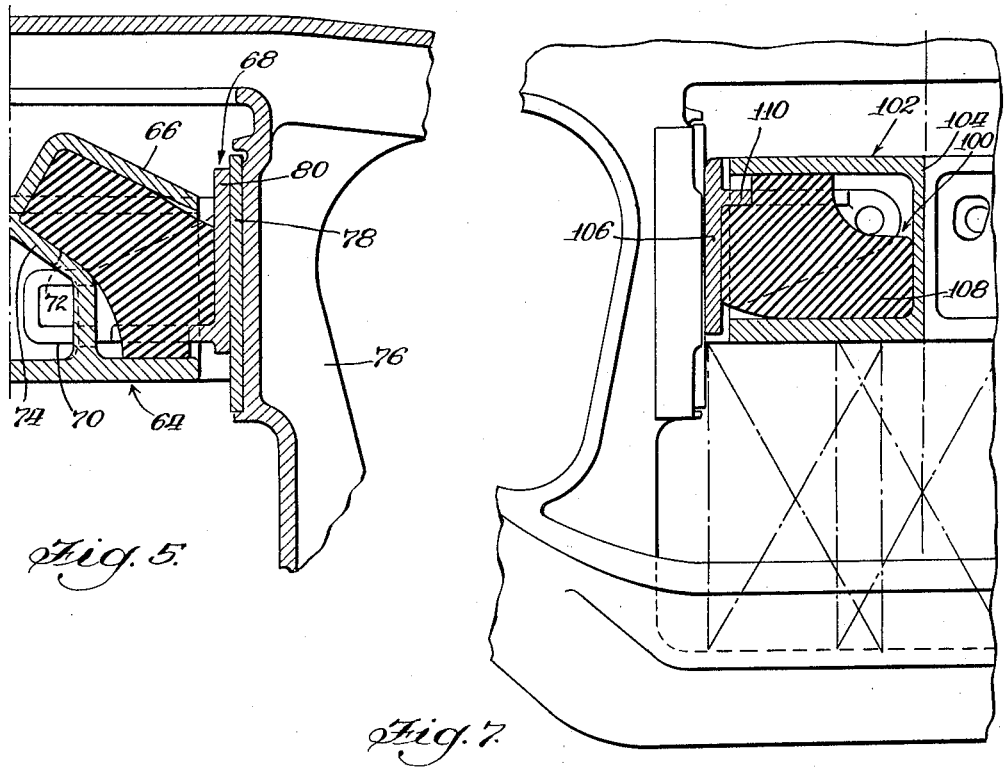
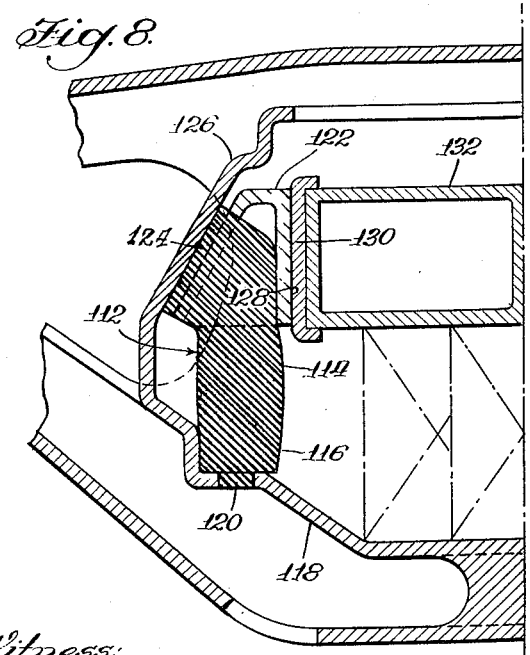
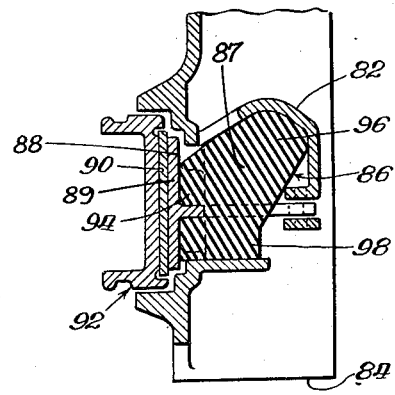
INVENTOR.
Walter H. Baselt
BY Walter L. Schlegel, Jr.
Atty.
Witness: Paul H. Gallagher

United States Patent Office 2,908,232
Patented Oct. 13, 1959

2,908,232

SNUBBED TRUCK

Walter H. Baselt, Flossmoor, Ill., assignor to American Steel Foundries, Chicago, Ill., a corporation of New Jersey Application August 13, 1956, Serial No. 603,620

16 Claims. (Cl. 105—197)

The present invention relates to snubbed trucks for railway freight cars, and more particularly to novel means for frictionally controlling the up-and-down movement of the load carrying springs of a railway freight car.

An object of the invention is to provide control means of the character noted of novel construction including springs of rubber or rubber-like material.

Another object is to eliminate metal-to-metal contact between the freight car bolster and snubbing shoe or equivalent parts, such as has heretofore occurred, and eliminate consequent wear.

Another object is to provide such control means in a railway freight car, including rubber spring means enabling angular displacement between the bolster and side frame while maintaining perfect alignment between the friction plate and engaged member.

A further object is to provide control means of the foregoing general character, including rubber spring means, which is effective for long periods of use and is free of such deterioration as from rust.

Another object is to provide control means of the general character noted, in which the necessity for precision fitting between parts is greatly reduced, relative to apparatus of this general nature heretofore in use, resulting in reduced costs.

Still another object is to provide rubber spring means of the character noted and a friction shoe in which the friction shoe has rubbing frictional engagement with its counterpart only in vertical direction, and the rubber spring means is mounted in a pocket and has bearing support in a plurality of directions whereby it has great effectiveness in biasing the friction shoe toward its counterpart.

Still another object is to provide rubber spring means for the general purpose noted which minimizes the harmonic vibration of the load carrying coil springs in connection with which it is used.

Another object is to provide snubber spring means of substantially constant pressure regardless of the vertical movement or position of the bolster.

Other objects are to provide a simple construction; to minimize wear in the friction shoe and its counterpart; to minimize cocking of the bolster; to eliminate binding as sometimes results in the case of rigid wedge means, and to eliminate diagonally disposed wear surfaces.

Other objects and advantages of the invention will appear from the following detailed description taken in conjunction with the accompanying drawings, in which:

Figure 1 is a side view of a portion of a railway car truck embodying the present invention, with portions shown in section;

Figure 2 is a sectional view taken on line 2—2 of Figure 1;

Figure 3 is an exploded perspective view of the snubber spring means of Figures 1 and 2;

Figure 4 is a partial view, oriented according to Figure 1, of a modified form of the device;

Figure 5 is a partial sectional view, oriented in a position transverse to that of Figure 4, of another modification;

Figure 6 is a partial view, oriented according to Figure 2, showing a further modification;

Figure 7 is a partial sectional view similar to Figure 6 but showing another modification, and Figure 8 is a partial sectional view, oriented according to Figure 1, showing another detail construction.

Referring now in detail to the drawings, attention is directed first to Figures 1, 2 and 3 showing a construction embodying the principles of the invention according to a preferred form. The construction is incorporated in a railway car side frame indicated generally at 12, which includes a compression member 14, tension member 16 and side columns 18 defining a bolster opening 20 therebetween. A bolster 22 is mounted in said opening on load carrying springs 24 in a conventional manner and, is well known, the bolster moves or vibrates in a vertical plane. This movement includes a vertical component and a transverse component, i.e. the movement is in a plane transverse to the side frame so that the transverse movement mentioned is in a direction longitudinal of the bolster. For convenience in representation, Figure 1 shows a first portion 22a of the bolster in the position it assumes in the case of a light car and another portion 22b in the position it assumes in the case of a loaded car.

The bolster 22, as seen in Figure 2, includes flanges or fork elements 26 spaced longitudinally along the bolster and telescoped over a portion of the side column 18 of the side frame. These flanges afford limiting means for the transverse movement of the bolster, mentioned above, by engaging the side portions 28 of the side frame column.

The snubber spring means, constituting the essence of the invention, is shown most clearly in Figure 3 and is indicated generally by the numeral 30 and includes two main parts, namely, a compression member 32 of rubber or rubber-like material and a shoe 34. The shoe 34 includes a friction plate 36 of substantial expanse having an outer wear surface 38 and an inner surface 40 from which extend a pair of wings 42 parallel to each other and perpendicular to the plate. At the lower portions of the wings are ribs 44 extending perpendicular to the plate and along the inner sides of the wings.

The rubber-like compression member 32 is provided with side grooves 46, which, in the assembly of the spring means, receive the ribs 44. The rubber-like compression member 32 is generally in the form of a triangular element, i.e., it includes three engaging portions for performing the compression function. These portions are indicated generally at 48, 50 and 52 and are distributed around the compression member as a whole in an arc of at least 180°. In the assembly of the compression member and shoe (Figures 1 and 2), the portion 52 is positioned below the ribs 44 and the portion 48 engages the inner surface 40 of the plate 36. The spring means assembly, i.e., assembled parts 34 and 32, are supported in a pocket 54. In the present instance, the pocket 54 is formed in the column 18 of the side frame and the spring means frictionally engages the bolster. However, it is practicable to reverse this order, as disclosed below, in which the spring means is supported in the bolster and it frictionally engages the column of the side frame. In the present instance, the bolster 22 is provided with a suitable wear plate 56 frictionally engaged by the plate 36 of the spring means when the various elements are in assembled position. Both of these elements are of planar form and of substantial area. Furthermore, they are disposed vertically or in the plane of the movement of the bolster.

The pocket 54 is of suitable size and shape to receive the rubber-like compression member 32 as well as the extended portions of the wings 42 of the shoe, while the plate 36 of the shoe is disposed outwardly of the pocket as is necessary in order to engage the bolster. In the present case, the portion 50 of the compression member extends at an acute angle to the plane of the plate 36 and the lower portion 52 of the compression member engages a lower wall 57 of the pocket. It will be noted that the compression member does not completely fill the pocket. The relative dimensions of the compression member and pocket are such that when the compression member is inserted in the pocket, the portion 48 extends slightly out of the pocket and is yieldingly biased in a direction generally perpendicular to the plane of the shoe plate 36 and friction surface of the bolster. The forces established are such that those exerted by the portions 50 and 52 form a force vector, as indicated by the arrow 58 (Figure 1) in the direction mentioned. As will be noted, particularly from Figure 2, the side portions 28 of the side frame column are a part of the pocket 54.

The vertical movement of the bolster is yieldingly resisted by the rubber-like compression member. Assume first, upward movement of the bolster; this movement, by reason of the friction established between the shoe and wear plate 56 drags and tends to move the shoe upward. The portion 48 of the rubber-like member, engaging the plate 36 and the ribs 44, is confined by the latter and moved upwardly by the shoe. This movement shortens the distance between the corner 60 of the shoe and the counterpart corner 62 of the pocket with the result that the compression member is compressed therebetween to a greater extent. The compression member 32 is free to expand or flow into the space 64 in the pocket.

Assume next the opposite movement, namely, downward movement of the bolster; in this case, the ribs 44 engage the portion 52 of the rubber-like compression member and the latter is compressed between the ribs and the lower wall 57 of the pocket, and it yieldingly resists downward movement of the shoe caused by frictional engagement between the shoe and bolster.

Movement of the bolster in lateral direction, i.e., in direction longitudinally of the bolster, is limited by the flanges 26 engaging the portions 28 of the pocket, but between these limits the bolster is permitted movement.

The rubber-like material of the compression member 32 is universally compressible, that is, it can be compressed or worked in all directions uniformly, and lateral movement of the bolster is frictionally resisted similarly to vertical movement.

The rubber-like material of the compression member 32 provides a hysteresis effect, i.e., there is an absence of spaced increments (as in a coil spring) with the result that the member 32 is devoid of harmonic period of vibration and for that reason is effective for damping the harmonic vibration of the load bearing springs 24.

Attention is directed to Figure 4 showing a construction very similar to that of Figures 1 to 3, but in which the snubber spring means 30 is relatively inverted vertically. In the present instance, the portion 50 of the spring means is directed at an inclined angle downwardly rather than upwardly, as in Figure 1. In the first case (Figure 1), the spring means has a greater retarding effect on upward movement of the bolster, while in the present instance (Figure 4), the spring means has a greater retarding effect on downward movement of the bolster.

Figure 5 involves an embodiment that includes a reversal of parts with respect to the first two embodiments, in that in the present instance the spring means is supported in a pocket in the bolster and frictionally engages a counterpart friction element on the side frame column. In the present instance, the bolster 64 includes a pocket 66 similar in all essential respects to the pocket 54 in the first instance, and the pressure shoe 68 is similar to the shoe 34 except that the wings 70 thereof extend through apertures 72 in a wall 74 of the pocket. The marginal edges of these apertures serve as positive limits for vertical movement of the shoe 68. The side frame column 76 is similar to the column 18 above and is provided with a wear plate 78 engaged by the plate 80 of the shoe 68 in the same manner as described in connection with the first embodiment. Friction is established between the shoe and the wear plate in the present instance that is equivalent to that established in the first embodiment.

Figure 6 is a horizontal, transverse, sectional view through a modified construction. This construction is similar to that of Figure 5 except that the snubber spring means is turned 90° about an axis extending longitudinally of the side frame, relative to that of Figure 5. In the present instance, the pocket 82 is formed in the bolster 84, and the snubber spring means 86, including a rubber spring element 87 and shoe 89 similar to the equivalent structure 30 in all material respects, is supported with the rubber spring element in the pocket. The spring means includes a plate 88 engaging a wear strip or plate 90 on the column 92 of the side frame. The spring means 86 has portions 94, 96 and 98 corresponding to the similar portions of the compression member 32 and distributed in a similar manner but in the present case lying in a transverse plane. The spring means, as arranged in the present embodiment, is more effective for retarding movement of the bolster in transverse direction.

Figure 7 is similar to Figures 5 and 6 in that the spring means is mounted in the bolster. However, in the present instance the spring means indicated generally at 100 is disposed in a pocket 102 in the bolster which includes a rear wall 104 parallel to the shoe plate 106. A compression member 108 fills a substantial part of the lower portion of the pocket and is compressibly confined between the rear wall 104 and the plate 106. The ribs 110 of the shoe extend perpendicularly from the plate and are thus perpendicular to the rear wall 104 as well. Upon downward movement of the shoe the ribs 110 produce a simple compressing effect on the rubber-like spring means 108 and the retarding action is produced thereby.

In Figure 8 is shown a means for mounting the spring means by securing it to certain elements in a more open area, rather than by confining it in a pocket. In the present instance, a spring means 112 includes a rubber-like compression member 114 which has a lower vertical column portion 116 engaging and resting on a wall element 118 of the side frame. A reduced projection 120 is fitted in an aperture in the wall element 118 and the spring means is secured against displacement thereby. At the upper end of the column or post 112 is a shoe 122 in the form of a cap fitted over the upper end of the column. This shoe or cap has a groove through which a portion 124 of the rubber-like compression member extends, and the latter engages an element 126 of the side frame. The shoe or cap 122 has a vertical friction surface 128 in frictional engagement with a wear plate 130 mounted on the bolster 132 in a suitable manner. The movement of the bolster, which is in a vertical transverse plane, is retarded by the friction established between the vertical surface 128 of the shoe and that of the wear plate 130.

In this embodiment, as in all of the embodiments herein, the rubber-like compression member is confined in such a way that the rubber-like compression member is yieldingly biased on a direction perpendicular to the plane of the friction surface and wearplate.

In all cases relative frictional movement is between vertically disposed surfaces.

The spring means, one of which preferably is mounted at each side of the bolster, retard vibration or movement of the bolster longitudinally of the side frame.

The construction enables a more simplified bolster-end construction.

The construction eliminates excessive surface wear such as between surfaces inclined to the vertical.

There is no binding effect as there is sometimes found between constructions involving rigid wedges, and angular displacement between the bolster and side frame is accommodated while perfect engagement between wear surfaces is maintained.

Since rubber constitutes a link between the bolster and side frame, the necessity for precision between the parts is greatly reduced.

The retarding or snubbing effect is uniform and constant regardless of the movement or position of the bolster.

I claim:

1. In a truck, a side frame having spaced columns defining a bolster opening, a bolster spring-supported in said opening and movable in a vertical plane extending transversely of the side frame, said bolster and one of said columns constituting a pair of members, said pair including a first member having a friction wall and a second member having spring means mounted thereto, said spring means including a rubber-like compression member, a rigid cap partially enclosing said compression member, a portion of said compression member being interposed between said cap and second member, said cap intermittently engaging said second member, said cap frictionally engaging said friction wall and said compression member having compression and supporting engagement in said second member at spaced portions thereof.

2. In a truck, a side frame having spaced columns defining a bolster opening, a bolster spring-supported in said opening and movable in a vertical plane extending transversely of the side frame, said bolster and one of said columns constituting a pair of members, said pair including a first member having a friction wall and a second member having spring means mounted thereto, said spring means including a compression member of universally compressible material, a friction shoe carried by said compression member and spaced from said second member, said spring means frictionally engaging said first member and having compression and supporting engagement in said second member at spaced areas of engagement.

3. In a truck, a side frame having spaced columns defining a bolster opening, a bolster spring-supported in said opening and movable in a vertical plane extending transversely of the side frame, said bolster and one of said columns constituting a pair of members, said pair including a first member having a vertical friction wall and a second member having spring means mounted thereto, said spring means including a rubber-like compression member and a friction member engaging the latter, said friction member frictionally engaging said friction wall, said compression member having compression and supporting engagement in said second member with surfaces spaced on opposite sides of a horizontal plane extending perpendicular to and intersecting said friction wall, said compression member being compressed by and between said friction member and second member.

4. In a truck, a side frame having spaced columns defining a bolster opening, a bolster spring-supported in said opening and movable vertically relative to the side frame, said bolster and one of said columns constituting a pair of members, said pair including a first member having a friction wall, and a second member having spring means mounted thereto, said spring means including a rubber-like compression member, a rigid cap engaging said compression member and said friction wall, said cap being spaced from the second member by said compression member, and said compression member having compression and supporting engagement with the second member.

5. In a truck, a side frame having spaced columns defining a bolster opening, a bolster spring-supported in said opening and movable in a vertical plane extending transversely of the side frame, said bolster and one of said columns constituting a pair of members, said pair including a first member having a friction wall and a second member having a pocket and spring means mounted therein, said spring means including a rubber-like compression member and a friction shoe having a surface frictionally engaging said friction wall, said compression member being disposed partially within and being compressed between said shoe and second member, said compression member having compression and supporting engagement against said second member in said pocket at areas spaced on opposite sides of a vertical plane extending longitudinally of the truck and intersecting said friction wall.

6. In a railway truck, a side frame having spaced columns defining a bolster opening, a bolster spring-supported in said opening and movable vertically, said bolster and one of said columns constituting a pair of members, said pair including a member having a planar friction surface and the other having a pocket and spring means mounted in said pocket, said spring means including a rubber-like compression member and a shoe in contact therewith, said shoe having horizontal ribs engaged in grooves in said compression member, and vertical side elements engaging the side surfaces of the compression member and having a plate engaging said friction surface, the compression member engaging spaced walls of said other member in said pocket, said compression member being compressed against a side of said plate facing said pocket, the side elements being engageable with said other member to limit displacement of said spring means relative to the other member.

7. A snubber spring device including a rubber-like compression member and a shoe mounted thereon, said shoe having a plate with an outer friction surface and the compression member having a first portion in engagement with an inner surface of said plate and having two other support-engaging portions, said shoe having wings on the inner side of said plate, ribs extending along the inner sides of said wings perpendicular to said plate, and grooves on said member receiving said ribs to confine a portion of said member.

8. A railway car truck comprising a supporting member, another member spring-supported therefrom, a friction surface on one of the members, a friction shoe pocket in the other of said members, a mass of flowable resilient material in said pocket, diverging sloping surfaces on said other member joining at a corner in said pocket, said other member having another surface in said pocket facing said sloping surfaces, a friction shoe in said pocket having a friction wall engaging said friction surface and having another wall extending into the pocket, said friction shoe walls defining another corner facing the first-mentioned corner, said mass being under compression by and between said shoe walls and said surfaces of said other member.

9. A railway car truck comprising supporting and supported members which are relatively movable vertically, a friction surface on one member, a friction shoe pocket in the other member partly defined by surfaces thereof which converge to a corner in said pocket and by another surface of said other member facing said corner, a friction shoe having a friction wall engaging the friction surface and having another wall in the pocket spaced from said other surface, and a resilient flowable mass in said pocket engaging said other wall along a surface thereof which faces the corner and along another surface of said other wall which faces said other surface of said other member, said mass engaging the friction wall and the converging surfaces.

10. A railway car truck comprising supporting and supported members which are relatively movable vertically, a friction surface on one member, a pocket in the other member partly defined by a corner, a friction shoe having a friction wall engaging the surface and having a corner facing said corner of said other member in said pocket, and a mass of flowable resilient material engaging said other member and shoe at said corners and engaging said other member along a surface spaced from and facing said other member corner.

11. A railway car truck comprising supporting and supported members capable of relative vertical movement, a friction area on one member, a pocket in the other member, friction means engaging said area, said other member having sloping surfaces in said pocket converging to a corner and having another surface in said pocket facing said corner, and said friction means comprising a mass of flowable resilient material compressed by and between said surfaces.

12. A railway car truck comprising supporting and supported members capable of relative vertical movement, a friction surface on one member, a pocket in the other member partly defined by angularly related spring seats, a friction shoe engaging the surface, and a mass of flowable resilient material engaged with the shoe and urging the latter against the friction surface, said mass engaging one of the seats, said mass having a portion housed in the shoe, said mass having another portion extending through a slot of the shoe and engaging the other seat, said shoe in static position of the bolster being held by said mass in spaced relationship to said other member.

13. A railway car truck comprising supporting and supported members capable of relative vertical movement, a friction area on one member, a pocket in the other member, a friction shoe in the pocket engaging said area, said shoe and other member each having surfaces converging to a corner, the corners facing each other, a surface on said other member facing its corner and spaced from the shoe, and a resilient, flowable mass engaging all of said surfaces.

14. A railway car truck according to claim 13 wherein the pocket is in the supported member and wherein the last-mentioned surface is disposed outboardly of the last-mentioned corner, and wherein the shoe corner is disposed inboardly of the outboard edge of the friction area.

15. A railway car truck comprising a side frame having a column, a bolster end spring-supported by said frame, a friction surface on the bolster, an upwardly facing spring seat on said frame below the level of said end, a friction shoe having a wall on one side thereof engaging said surface, and a mass of flowable resilient material supported at its lower end by said seat, said mass being compressed against said column and against said wall at its opposite side, said shoe being entirely spaced from the column and frame by said mass.

16. A railway car truck comprising a side frame having a column, a bolster end spring-supported by the frame, and having a friction surface, a surface on said column sloping upwardly toward the bolster end, an upwardly facing spring seat on said frame below the level of said bolster end, a friction shoe having a wall engaged with the friction surface, and a mass of flowable resilient material compressed at its lower end against said seat, said wall having a surface facing the column surface, and said mass being compressed against said wall surface and said column surface and said mass spacing the shoe from said column surface.

References Cited in the file of this patent

UNITED STATES PATENTS

| | | |
|---|---|---|
| 2,485,970 | Lehrman | Oct. 25, 1949 |
| 2,485,971 | Light | Oct. 25, 1949 |
| 2,485,972 | Lehrman | Oct. 25, 1949 |
| 2,520,845 | Lehrman | Aug. 29, 1950 |
| 2,578,480 | Lehrman | Dec. 11, 1951 |
| 2,747,518 | Campbell | May 29, 1956 |